(12) United States Patent
Huang et al.

(10) Patent No.: US 12,298,226 B2
(45) Date of Patent: May 13, 2025

(54) SENSING RACK AND SENSING RACK SET

(71) Applicant: RHYMEBUS CORPORATION, Taichung (TW)

(72) Inventors: Hsuan-Yu Huang, Taichung (TW); Chiu-Hsiung Chen, Taichung (TW); Shun-Han Ko, Taichung (TW); Yu-Hung Lin, Taichung (TW); Hsien-Tang Jao, Taichung (TW)

(73) Assignee: RHYMEBUS CORPORATION, Taichung (TW)

( * ) Notice: Subject to any disclaimer, the term of this patent is extended or adjusted under 35 U.S.C. 154(b) by 575 days.

(21) Appl. No.: 17/663,830

(22) Filed: May 18, 2022

(65) Prior Publication Data

US 2023/0221240 A1 Jul. 13, 2023

(30) Foreign Application Priority Data

Jan. 11, 2022 (TW) ................................. 111101174
Jan. 11, 2022 (TW) ................................. 111200390

(51) Int. Cl.
*G01N 21/03* (2006.01)
*G01N 21/01* (2006.01)

(52) U.S. Cl.
CPC ..... *G01N 21/03* (2013.01); *G01N 2021/0112* (2013.01); *G01N 2021/0375* (2013.01)

(58) Field of Classification Search
USPC ..................................................... 250/492.1
See application file for complete search history.

(56) References Cited

U.S. PATENT DOCUMENTS

| 5,126,577 | A | * | 6/1992 | Trent | ........................ | G01J 5/53 |
| | | | | | | 250/504 R |
| 2006/0044672 | A1 | * | 3/2006 | Steinhilber | ............ | G11B 17/28 |
| | | | | | | 360/92.1 |

FOREIGN PATENT DOCUMENTS

| CN | 110742416 A | 2/2020 |
| CN | 113243680 A | 8/2021 |
| CN | 214097819 U | 8/2021 |
| JP | H812027 A | 1/1996 |
| TW | 380408 U | 1/2000 |
| TW | M586706 U | 11/2019 |
| TW | 202019794 A | 6/2020 |
| TW | I699317 B | 7/2020 |

* cited by examiner

*Primary Examiner* — Kiet T Nguyen
(74) *Attorney, Agent, or Firm* — CKC & Partners Co., LLC

(57) ABSTRACT

A sensing rack includes a base, a plurality of sensing mechanisms, and a plurality of displaying elements. The base includes a plurality of accommodating spaces. The sensing mechanisms are disposed in the base, and each of the sensing mechanisms correspond to each of the accommodating spaces and includes a light sensing component and a light blocking element. A light sensing component includes a light emitting element and a light receiving element. The light blocking element is drivable to move between the light emitting element and the light receiving element so as to control a light of the light emitting element to enter the light receiving element or not. Each of the displaying elements is electrically connected with the light receiving element of each of the sensing mechanisms and is for displaying the light of each of the light emitting elements entering the light receiving element or not.

20 Claims, 9 Drawing Sheets

SENSING RACK AND SENSING RACK SET

RELATED APPLICATIONS

This application claims priority to Taiwan Application Serial Number 111101174, filed Jan. 11, 2022, and Taiwan Application Serial Number 111200390, filed Jan. 11, 2022, which are herein incorporated by reference.

BACKGROUND

Technical Field

The present disclosure relates to a sensing rack and a sensing rack set. More particularly, the present disclosure relates to a sensing rack and a sensing rack set which are able to maintain high sensing accuracy during contain various of object.

Description of Related Art

Racks are widely used in every field of daily life, and many advanced racks such as sensing racks have a sensing function so as to detect the condition of the object contained therein. For example, in many industrial manufacturing processes, sensing racks are usually used for storing coil stocks, making the process of placing or taking coil stocks become more convenient and decreasing the possibility of coil stocks being mistaken or misdisposed. In addition to the application in industrial field, sensing racks can also be applied to placing objects like books, merchandises or drugs. In the conventional art, most of the sensing racks have an infrared light sensing function so as to detect an object is disposed therein or not and the sort of the disposed object.

The sensing principle of conventional sensing racks with the infrared light sensing function is to block the infrared light by the disposed object so as to make the electronic system finally send a cuing signal such as flashing or sounding in order to remind the user that the object is disposed or taken accurately or not and the position where the object is disposed is correct or not. However, when the object disposed in the conventional sensing racks is transparent, the infrared light is able to pass through the object, which results in the aforementioned detecting system sends a cuing signal different from the actual state. In practical use, the disoperation mentioned above leads to not only needing meaningless manpower and time to confirm the object state, but also causing various negative influences if the object or the raw material disposed in the conventional sensing racks being misuse.

Therefore, developing a sensing rack and a sensing rack set which are able to maintain high sensing accuracy during contain any kind of object has its practical value.

SUMMARY

According to one aspect of the present disclosure, a sensing rack includes a base, a plurality of sensing mechanisms and a plurality of displaying elements. The base includes a plurality of accommodating spaces. The sensing mechanisms are disposed in the base corresponding to at least one sidewall of the base, and each of the sensing mechanisms correspond to each of the accommodating spaces, wherein each of the sensing mechanisms includes a light sensing component and a light blocking element. The light sensing component includes a light emitting element and a light receiving element, wherein the light emitting element and the light receiving element are disposed relatively. The light blocking element is disposed in each of the accommodating spaces, and the light blocking element is drivable to move between the light emitting element and the light receiving element so as to control a light of the light emitting element to enter the light receiving element or not. Each of the displaying elements is electrically connected with the light receiving element of each of the sensing mechanisms, and each of the displaying elements is for displaying the light of each of the light emitting elements entering the light receiving element or not.

According to another aspect of the present disclosure, a sensing rack set includes at least two sensing racks and a connecting supporting element. Each of the sensing racks includes a base, a plurality of sensing mechanisms and a plurality of displaying elements. The base includes a plurality of accommodating spaces. The sensing mechanisms are disposed in the base corresponding to at least one sidewall of the base, and each of the sensing mechanisms correspond to each of the accommodating spaces, wherein each of the sensing mechanisms includes a light sensing component and a light blocking element. The light sensing component includes a light emitting element and a light receiving element, wherein the light emitting element and the light receiving element are disposed relatively. The light blocking element is disposed in each of the accommodating spaces, and the light blocking element is drivable to move between the light emitting element and the light receiving element so as to control a light of the light emitting element to enter the light receiving element or not. Each of the displaying elements is electrically connected with the light receiving element of each of the sensing mechanisms, and each of the displaying elements is for displaying the light of each of the light emitting elements entering the light receiving element or not. The connecting supporting element connects and supports the at least two sensing racks.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
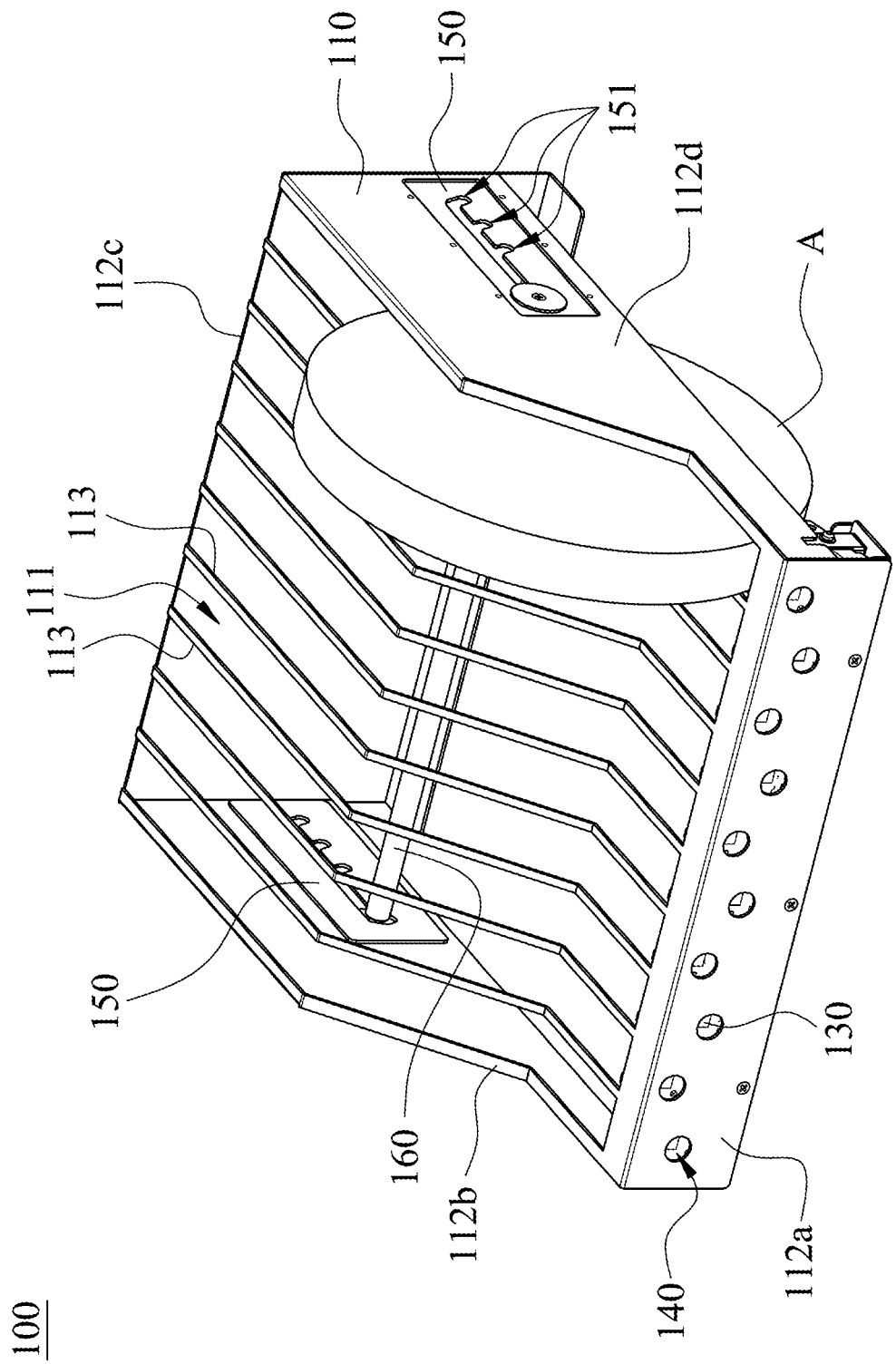
FIG. 1 is a three-dimensional structure schematic view of a sensing rack according to one example of one embodiment of the present disclosure.
Figure 2:
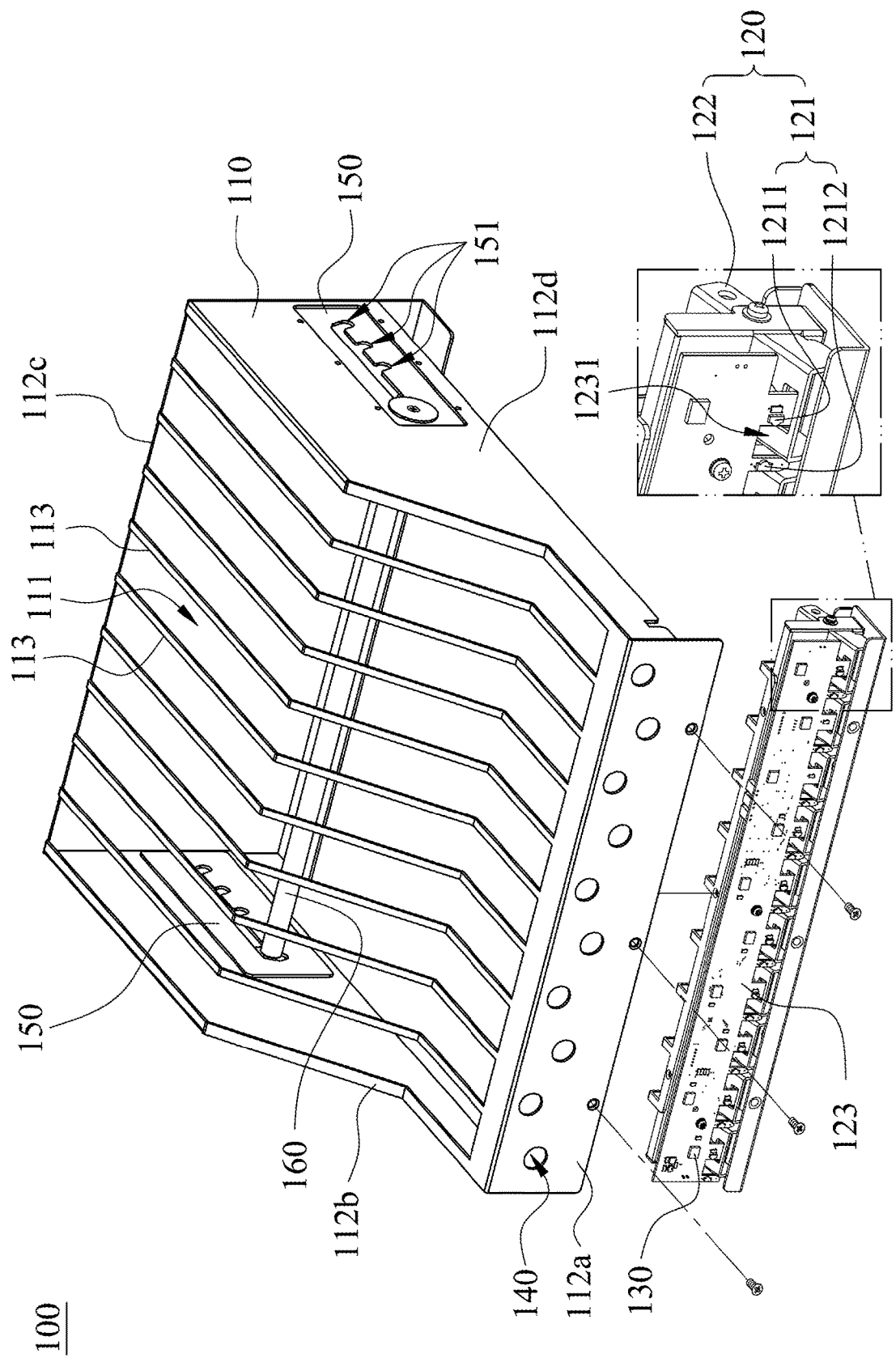
FIG. 2 is an exploded view of the example of the sensing rack in FIG. 1.

Please refer to FIG. 1 and FIG. 2. FIG. 1 is a three-dimensional structure schematic view of a sensing rack 100 according to one example of one embodiment of the present disclosure. FIG. 2 is an exploded view of the example of the sensing rack 100 in FIG. 1. According to FIG. 1 and FIG. 2, the sensing rack 100 includes a base 110, a plurality of sensing mechanisms 120 and a plurality of displaying elements 130. The base 110 includes a plurality of accommodating spaces 111. The sensing mechanisms 120 are disposed in the base 110 corresponding to at least one sidewall 112a of the base 110, and each of the sensing mechanisms 120 corresponds to each of the accommodating spaces 111, wherein each of the sensing mechanisms 120 includes a light sensing component 121 and a light blocking element 122. The light sensing component 121 includes a light emitting element 1211 and a light receiving element 1212, wherein the light emitting element 1211 and the light receiving element 1212 are disposed relatively. The light blocking element 122 is disposed in each of the accommodating spaces 111, and the light blocking element 122 is drivable to move between the light emitting element 1211 and the light receiving element 1212 so as to control a light of the light emitting element 1211 to enter the light receiving element 1212 or not. Each of the displaying elements 130 is electrically connected with the light receiving element 1212 of each of the sensing mechanisms 120, and each of the displaying elements 130 is for displaying the light of each of the light emitting elements 1211 entering the light receiving element 1212 or not. Therefore, when an object A is disposed into the accommodating spaces 111, the light blocking element 122 is driven and moved between the light emitting element 1211 and the light receiving element 1212. When the light enters or does not enter the light receiving element 1212, the displaying elements 130 receives a signal from the light receiving element 1212 so as to display whether the object A is disposed or disposed accurately. Thus, it is favorable for operators to confirm the disposing state of the object A. In particular, the object A can be an industrial coil stock, a book, a disk, etc., and the present disclosure is not limited thereto.

In detail, the sensing rack 100 can further include a plurality of supporting ribs 113, which are connected with the sidewall 112a and the sidewall 112c of the base 110, and every two of the supporting ribs 113 adjacent to each other form each of the accommodating spaces 111. According to the example in FIG. 1, two ends of each of the supporting ribs 113 connect with sidewall 112a and the sidewall 112c, respectively, so that each of the supporting ribs 113 can be stably connected with the base 110 and form each of the accommodating spaces 111.

According to FIG. 2, the sensing rack 100 can further include at least one positioning element 123, which is disposed at the at least one sidewall 112a, and the sensing mechanisms 120 are disposed on the positioning element 123. The positioning element 123 has a plurality of through holes 1231 which correspond to the accommodating spaces 111, respectively, and the light emitting element 1211 and the light receiving element 1212 of each of the sensing mechanisms 120 are disposed at two sides of each of the through holes 1231, respectively. Therefore, the sensing mechanisms 120 can be stably disposed at the sidewall 112a of the base 110 by the positioning element 123. When a failure occurs to the sensing mechanisms 120 or the sensing mechanisms 120 need to be fixed or maintained, the operators only need to disassemble the positioning element 123 easily from the base 110 for the maintaining process. According to FIG. 2, the light emitting element 1211 of each of the sensing mechanisms 120 is located at the left side of each of the through holes 1231, and the light receiving element 1212 of each of the sensing mechanisms 120 is located at the right side of each of the through holes 1231. The light emitted by the light emitting element 1211 can be an infrared light, but the present disclosure is not limited by the relative position between the light emitting element 1211 and the light receiving element 1212 or the kind of the light emitted by the light emitting element 1211.

Figure 3A:
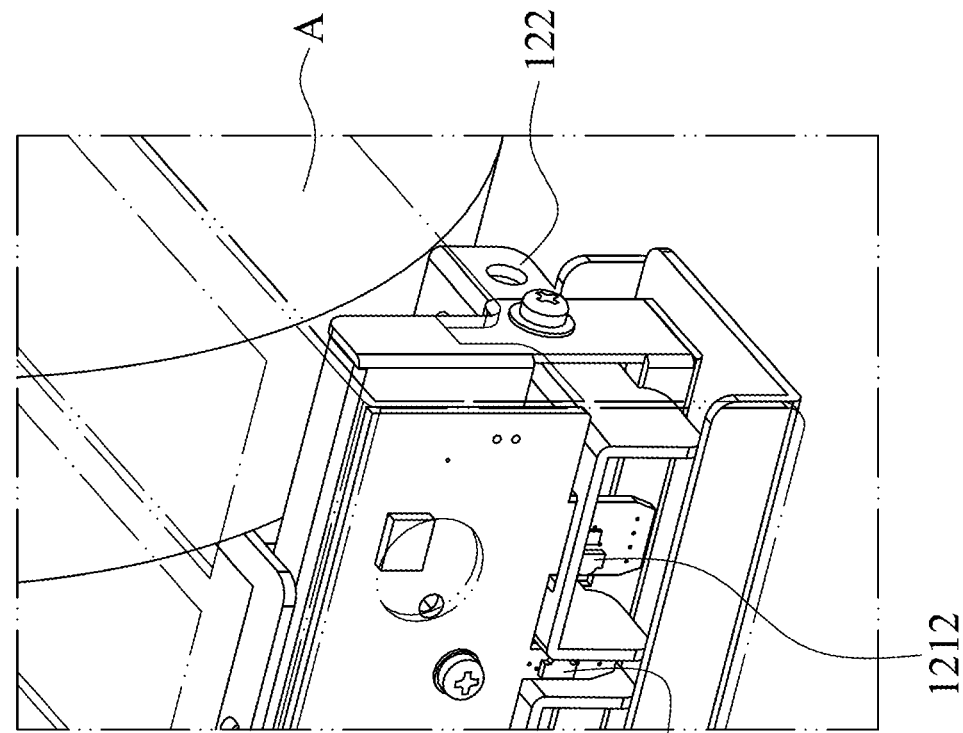
FIG. 3A is a schematic view of the light blocking element of FIG. 2 which is at a state of without being driven.
Figure 3B:
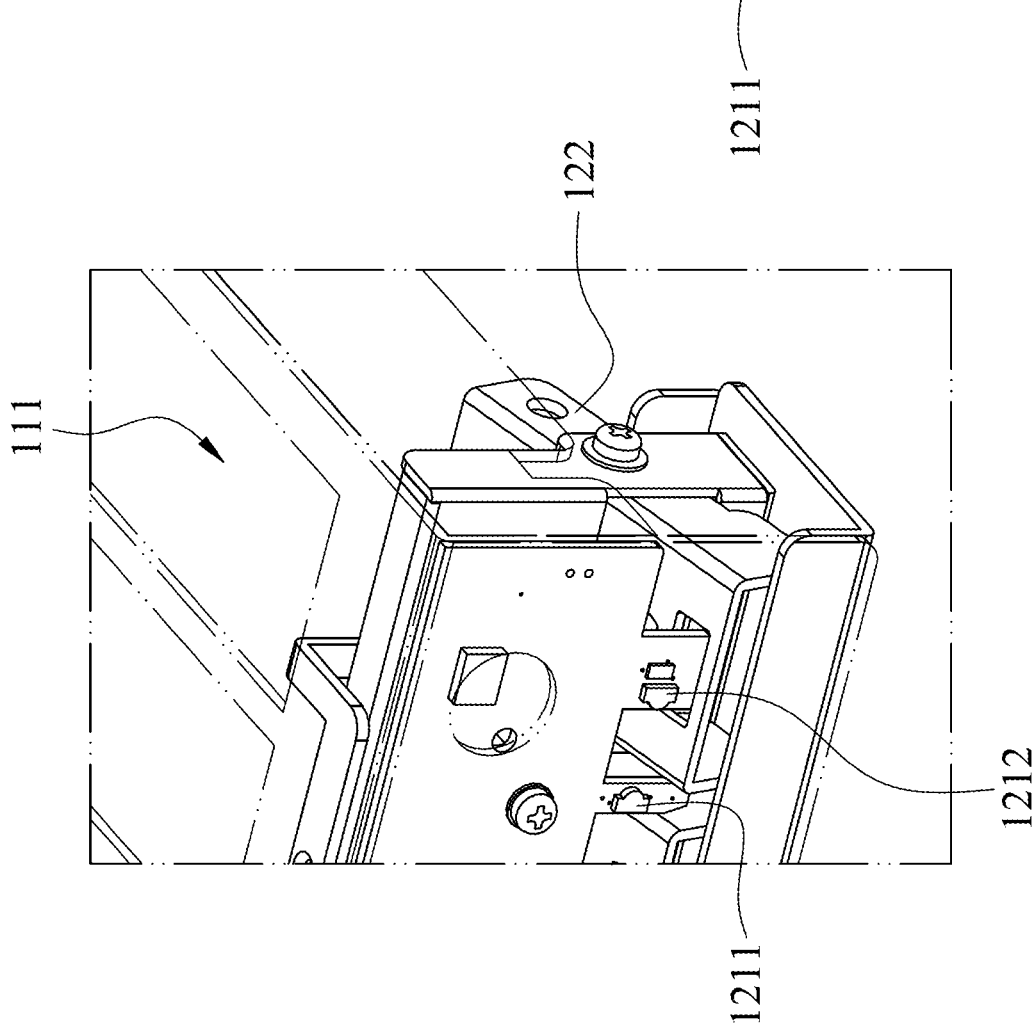
FIG. 3B is a schematic view of the light blocking element of FIG. 2 which is at a state of being driven.

Please also refer to FIG. 3A and FIG. 3B. FIG. 3A is a schematic view of the light blocking element 122 of FIG. 2 which is at a state of without being driven. FIG. 3B is a schematic view of the light blocking element 122 of FIG. 2 which is at a state of being driven. In detail, the light blocking element 122 of each of the sensing mechanisms 120 can be pivotally disposed at the positioning element 123, and one end of the light blocking element 122 can be passed through each of the through holes 1231. Therefore, as shown as FIG. 3B, when the object A is disposed in the accommodating spaces 111, the weight of the object A drives the other end of the light blocking element 122 so as to move the end between the light emitting element 1211 and the light receiving element 1212, relatively, and block the light emitted towards the light receiving element 1212 by the light emitting element 1211. Moreover, a center of mass of the light blocking element 122 of each of the sensing mechanisms 120 can be closer to the end of the light blocking element 122 which can be moved between the light emitting element 1211 and the light receiving element 1212. Therefore, as shown in FIG. 3A, when the object A is removed from the accommodating spaces 111, the end which can be moved between the light emitting element 1211 and the light receiving element 1212 naturally returns to the original position from the position between the light emitting element 1211 and the light receiving element 1212, that is, no other requirement to dispose any other component or element to drive the light blocking element 122 back to the original position.

In particular, the light emitted by the light emitting element of the conventional sensing rack is blocked by the body of the object disposed in the conventional sensing rack. However, when the object disposed in the conventional sensing rack is transparent or light transmittable, the light emitted by the light emitting element can easily pass through the object and be received by the light receiving element, which results in the displaying element sending a wrong signal. Then, more labor cost and time are needed to confirm the state of the sensing rack, and it is also possible to mistake the object. Thus, the sensing rack 100 of the present disclosure blocks the light by the light blocking element 122, which is favorable to prevent wrong signals due to the difference of objects so as to further minimize the negative effects caused by disoperation.

Further, according to the example shown in FIG. 2, the displaying elements 130 can also be disposed at the positioning element 123. When the other end of the light blocking element 122 is driven for blocking the light emitted towards the light receiving element 1212 by the light emitting element 1211, the light receiving element 1212 sends a signal to make the displaying elements 130 send a cuing signal representing "an object is correctly disposed in the accommodating spaces 111". In contrast, when the other end of the light blocking element 122 is not driven so as to make the light emitted towards the light receiving element 1212 by the light emitting element 1211 not be blocked, the light receiving element 1212 sends another signal to make the displaying elements 130 send a cuing signal representing "an object is not disposed or is not correctly disposed in the accommodating spaces 111". Moreover, the displaying elements 130 can be a plurality of three primary color light-emitting diode modules, but the present disclosure is not limited thereto.

In other examples, when the sensing rack of the present disclosure is used in a specific way, an outer calibrating system can be connected to the sensing rack so as to adjust the settings and change the meanings of the cuing signals sent by the displaying elements. Further, the disoperation of the displaying elements can be also adjusted by the outer calibrating system. The technical detail of the outer calibrating system is the common technical information of the related field, and will not be further described herein.

In detail, the aforementioned cuing signals can be lighting-on, lighting-off, flashing, etc., and can further use with a sounding element such as buzzer to send a cuing sound for reminding, but the present disclosure is not limited thereto.

In order to make cuing signals more easily to be observed, the sidewall 112a can further include a plurality of displaying holes 140. Each of the displaying holes 140 corresponds to each of the displaying elements 130, which is favorable to perform subsequent actions.

In FIG. 1 and FIG. 2, the sensing rack 100 can further include at least one slide rail set and at least one moveable axle 160. The slide rail set can include two slide rails 150, and the two slide rails 150 can be correspondingly disposed at other two sidewalls (sidewall 112b and sidewall 112d) of the base 110, respectively. The two ends of the moveable axle 160 can be moveably disposed at the two slide rails 150, respectively, and the moveable axle 160 can be disposed through the accommodating spaces 111. In detail, each of the two slide rails 150 has a plurality of grooves 151, which are for fixing the position of the moveable axle 160 at the two slide rails 150. Therefore, the operators can adjust the position of the moveable axle 160 and engage the moveable axle 160 into the grooves 151 at the slide rails 150 so as to adjust the accommodating spaces 111 for fitting different sizes of the objects, and is favorable for managing the sensing rack 100.

Figure 4:
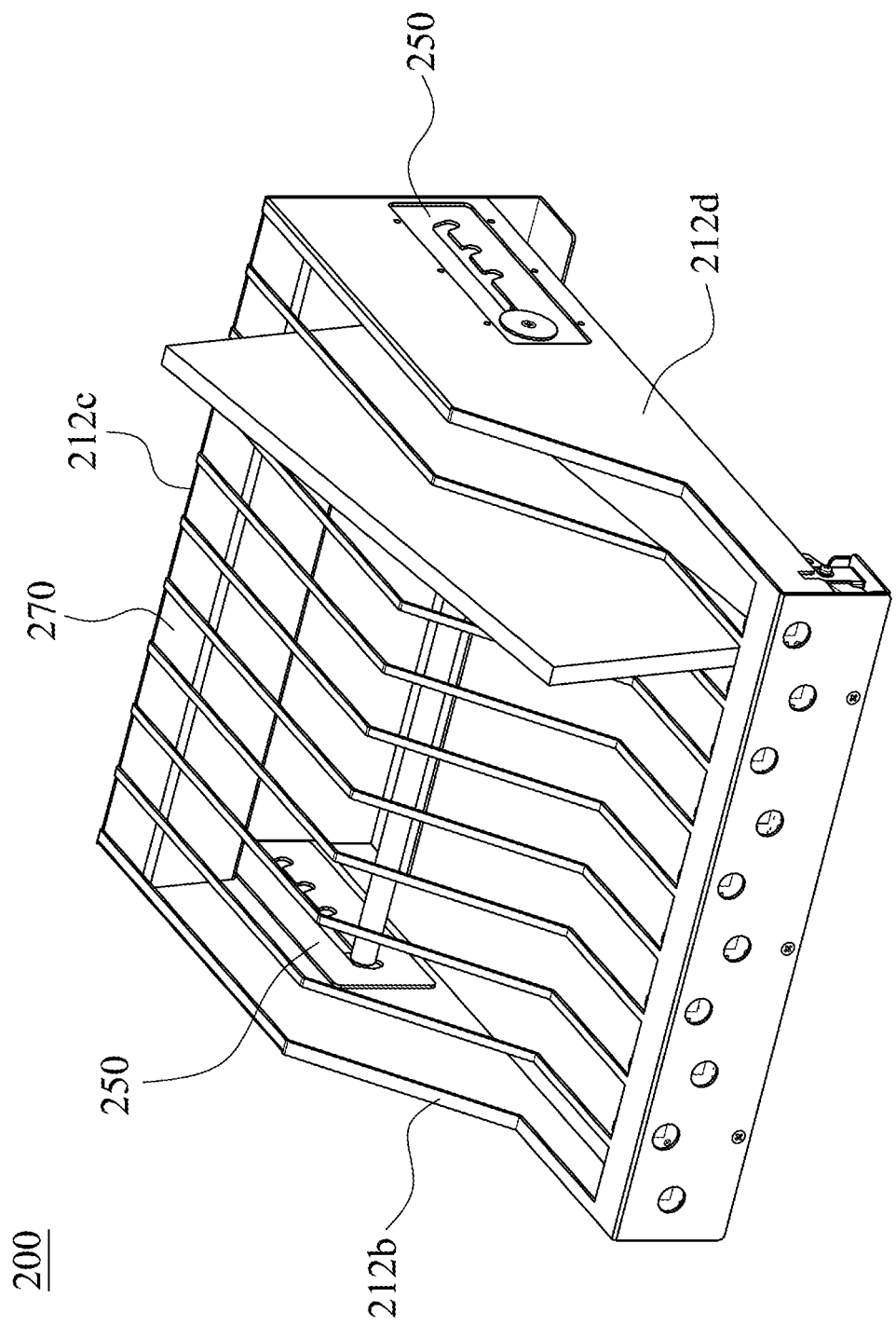
FIG. 4 is a three-dimensional structure schematic view of a sensing rack according to another example of the embodiment of the present disclosure.

Please refer to FIG. 4. FIG. 4 is a three-dimensional structure schematic view of a sensing rack 200 according to another example of the embodiment of the present disclosure. In comparison with the example of sensing rack 100 shown in FIG. 1, the sensing rack 200 further includes a fitting element 270. The fitting element 270 is disposed above two slide rails 250 of a slide rail set and connected with sidewalls 212b, 212c, 212d of the sensing rack 200. According to the example of the sensing rack 200 shown in FIG. 4, the fitting element 270 can provide an engaging function so as to contain other objects or industrial raw materials with different shapes (such as rectangle) or different sizes. Thus, it is favorable for avoiding the objects falling from the sensing rack 200 while shaking.

Figure 5:
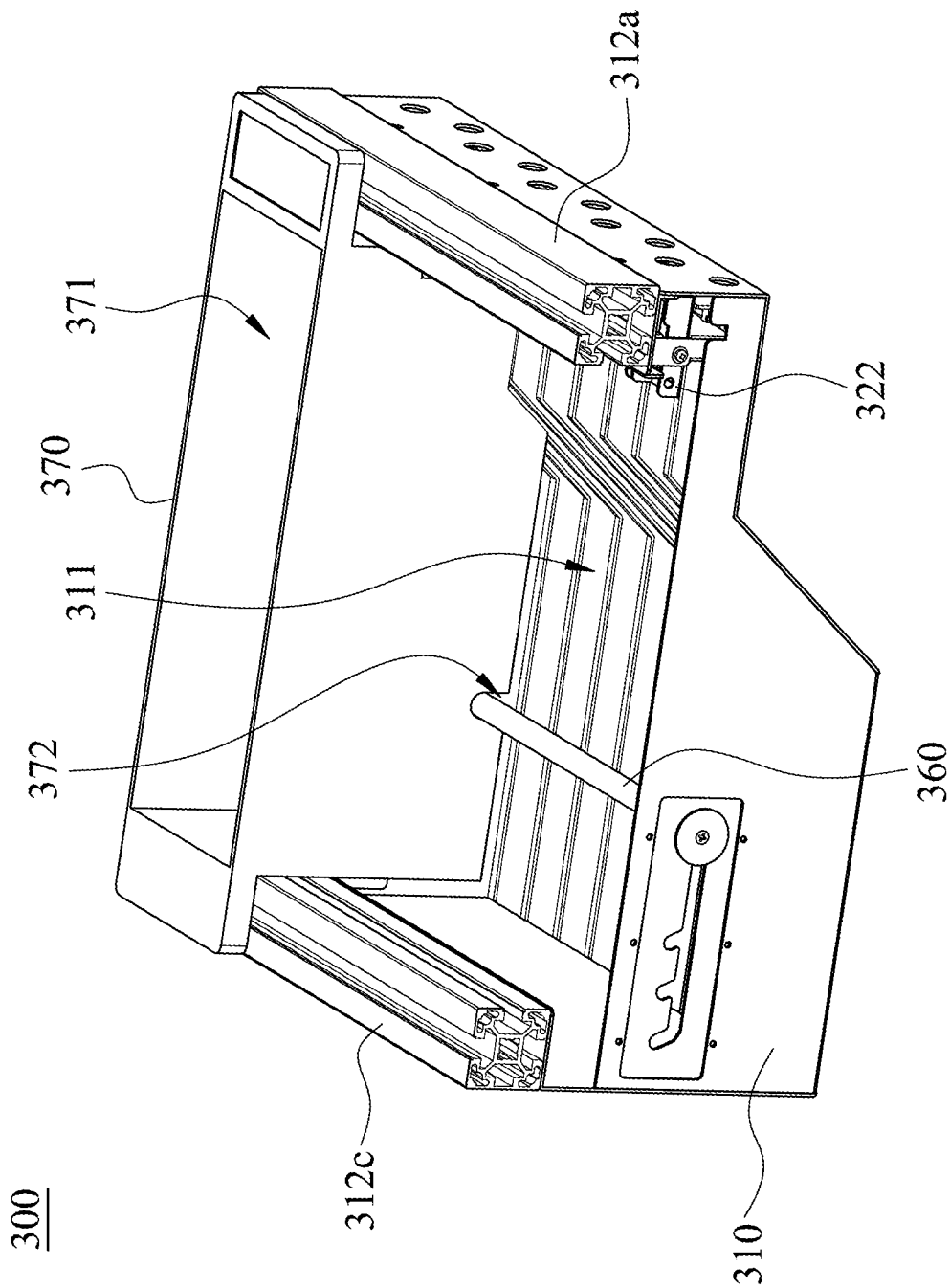
FIG. 5 is a three-dimensional structure schematic view of a sensing rack according to one another example of the embodiment of the present disclosure.

Please refer to FIG. 5. FIG. 5 is a three-dimensional structure schematic view of a sensing rack 300 according to one another example of the embodiment of the present disclosure. In comparison with the example of the sensing rack 100 shown in FIG. 1, the sensing rack 300 further includes a fitting element 370. The two ends of the fitting element 370 are disposed at sidewalls 312a, 312c of the sensing rack 300, respectively. The fitting element 370 can provide a storing space 371 and the bottom of the storing space 371 contacts with a light blocking element 322, wherein the fitting element 370 pushes the light blocking element 322 by the weight thereof. In FIG. 5, the fitting element 370 has a U-shaped groove 372 on a surface thereof towards the moveable axle 360, the moveable axle 360 can be disposed through the U-shaped groove 372. However, the U-shaped groove 372 can be provided on demand, and the present disclosure is not limited thereto. In detail, in the example of FIG. 5, the sensing rack 300 can be used in an inversion condition, that is, the fitting element 370 can be disposed at the sidewall 312a, the sidewall 312c and the moveable axle 360 after inverting the base 310. Therefore, the storing space 371 of the fitting element 370 can be used for storing raw materials in bulk or item with small size such as medicines and small components. Further, the accommodating spaces 311 which are not occupied by the fitting element 370 can be used for disposing other objects such as industrial coil stocks, books and disks, but the present disclosure is not limited thereto.

Moreover, in comparison with the sensing rack 100 shown in FIG. 1 and the sensing rack 200 shown in FIG. 4, the sensing rack 300 in FIG. 5 is used in an inversion condition. Therefore, when an object (not shown) or the fitting element 370 is disposed in the accommodating spaces 311, the weight of the object or the fitting element 370 drives the other end of the light blocking element 322 so as to make the end passed through each of the through holes (their reference numeral are omitted) relatively and moving to the position which is not between the light emitting element (not shown) and the light receiving element (not shown), so that the light emitted towards the light receiving element by the light emitting element is not blocked by the light blocking element 322. Therefore, the light receiving element further sends a signal to the displaying element and make the displaying elements send a cuing signal representing "an object or the fitting element 370 is correctly disposed in the accommodating spaces 311". In contrast, due to a center of mass of the light blocking element 322 can be closer to the end of the light blocking element 322 which can be passed through the through holes, when the object or the fitting element 370 is removed from the accommodating spaces 311, the end passed through each of the through holes of the light blocking element 322 naturally returns to the original position which is between the light emitting element and the light receiving element so as to block the light emitted towards the light receiving element by the light emitting element, and further make the light receiving element send another signal to make the displaying elements send a cuing signal representing "an object or the fitting element 370 is not disposed in or not correctly disposed in the accommodating spaces 311".

Figure 6:
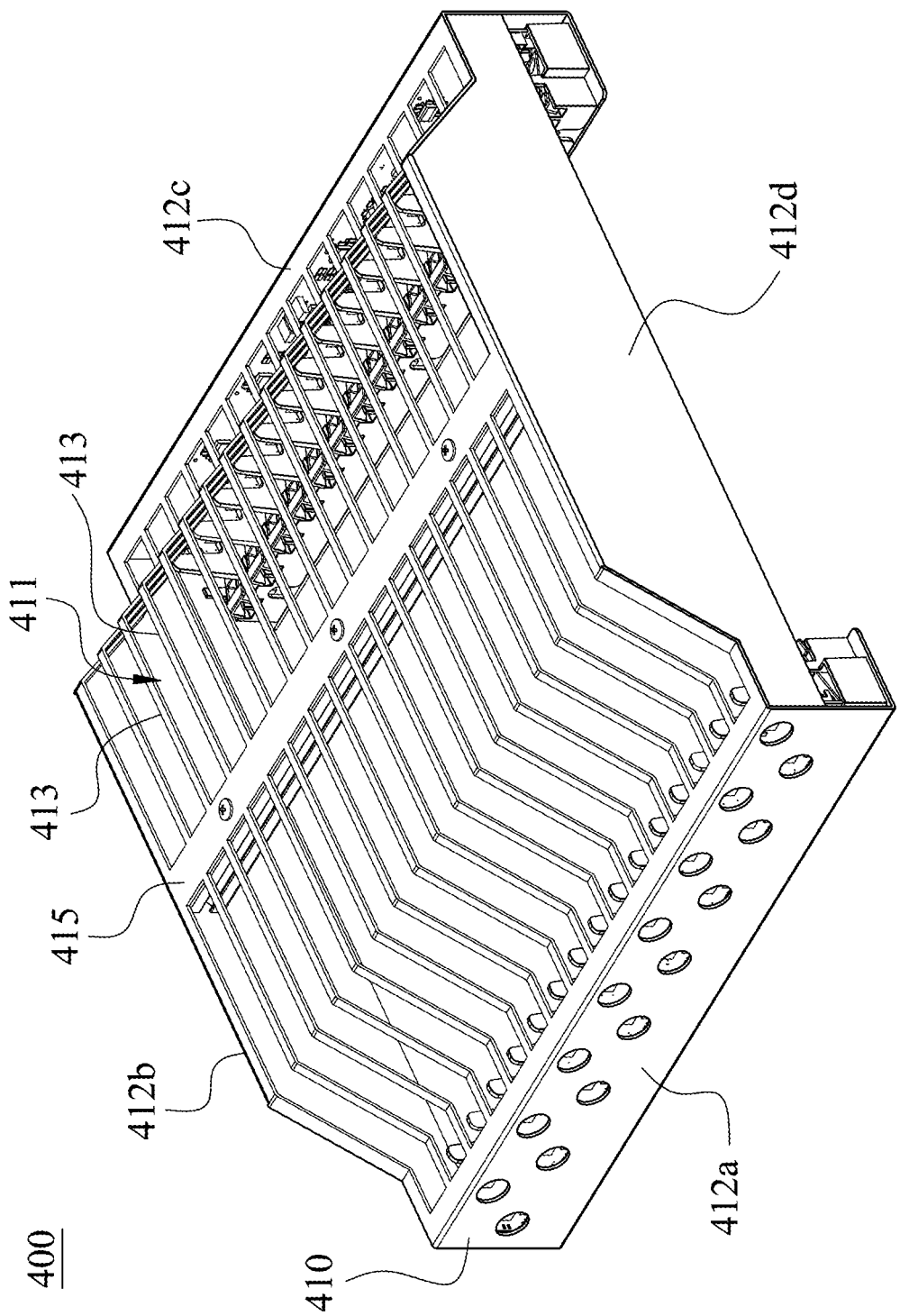
FIG. 6 is a three-dimensional structure schematic view of a sensing rack according to further another example of the embodiment of the present disclosure.
Figure 7:
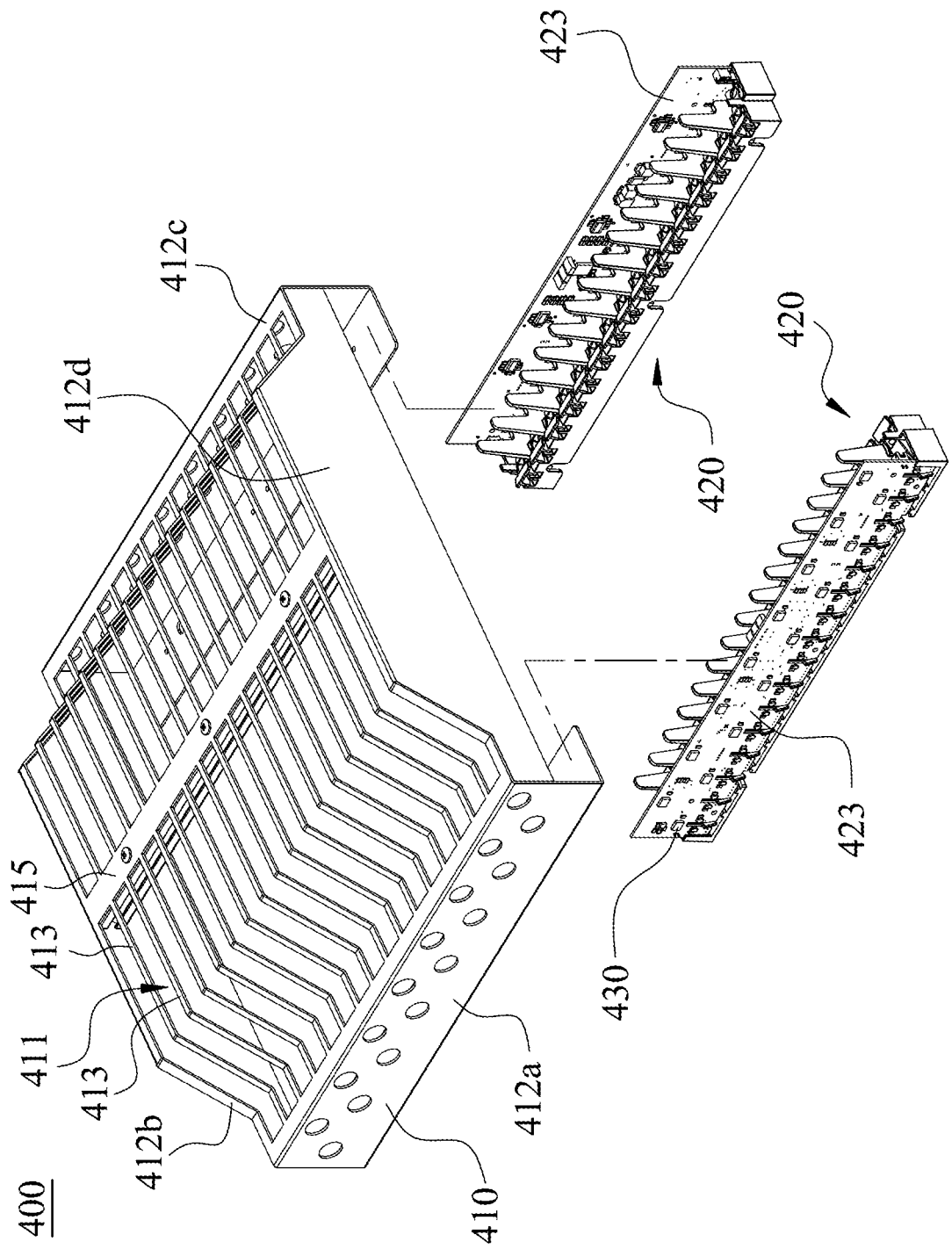
FIG. 7 is an exploded view of the sensing rack in FIG. 6.

Please refer to FIG. 6 and FIG. 7. FIG. 6 is a three-dimensional structure schematic view of a sensing rack 400 according to further another example of the embodiment of the present disclosure. FIG. 7 is an exploded view of the sensing rack 400 in FIG. 6. According to FIG. 6 and FIG. 7, the sensing rack 400 includes a base 410, a plurality of sensing mechanisms 420 and a plurality of displaying elements 430. The base 410 includes a plurality of accommodating spaces 411. The sensing mechanisms 420 are disposed in the base 410 corresponding to a sidewall 412a and a sidewall 412c of the base 410, and each of the sensing mechanisms 420 corresponds to each of the accommodating spaces 411. The sensing rack 400 can further include two positioning elements 423, which are disposed at the sidewall 412a and a sidewall 412c, respectively, and the sensing mechanisms 420 are disposed at the two positioning elements 423, respectively. The connecting relationships and the details of the included elements of the base 410, the sensing mechanisms 420, the displaying elements 430 and the positioning elements 423 of the sensing rack 400 are the same as the connecting relationships and the details of the included elements of the base 110, the sensing mechanisms 120, the displaying elements 130 and the positioning element 123 of the sensing rack 100 according to the example shown in FIG. 1, and will not be described again herein.

In particular, the sensing rack 400 can further include a plurality of supporting ribs 413 and a separating rib 415. The separating rib 415 is disposed at and connected with a sidewall 412b and a sidewall 412d. The supporting ribs 413 are connected with the separating rib 415 and the sidewall 412a or connected with the separating rib 415 and the sidewall 412c, and every two of the supporting ribs 413 adjacent to each other and the separating rib 415 form each of the accommodating spaces 411, and the accommodating spaces 411 correspond to the sensing mechanisms 420 at two sides, respectively. Therefore, in comparison with the sensing rack 100 in FIG. 1, the sensing rack 400 provides more accommodating spaces 411, sensing mechanisms 420 and displaying elements 430. Therefore, the sensing rack 400 has a higher storage limitation.

Figure 8:
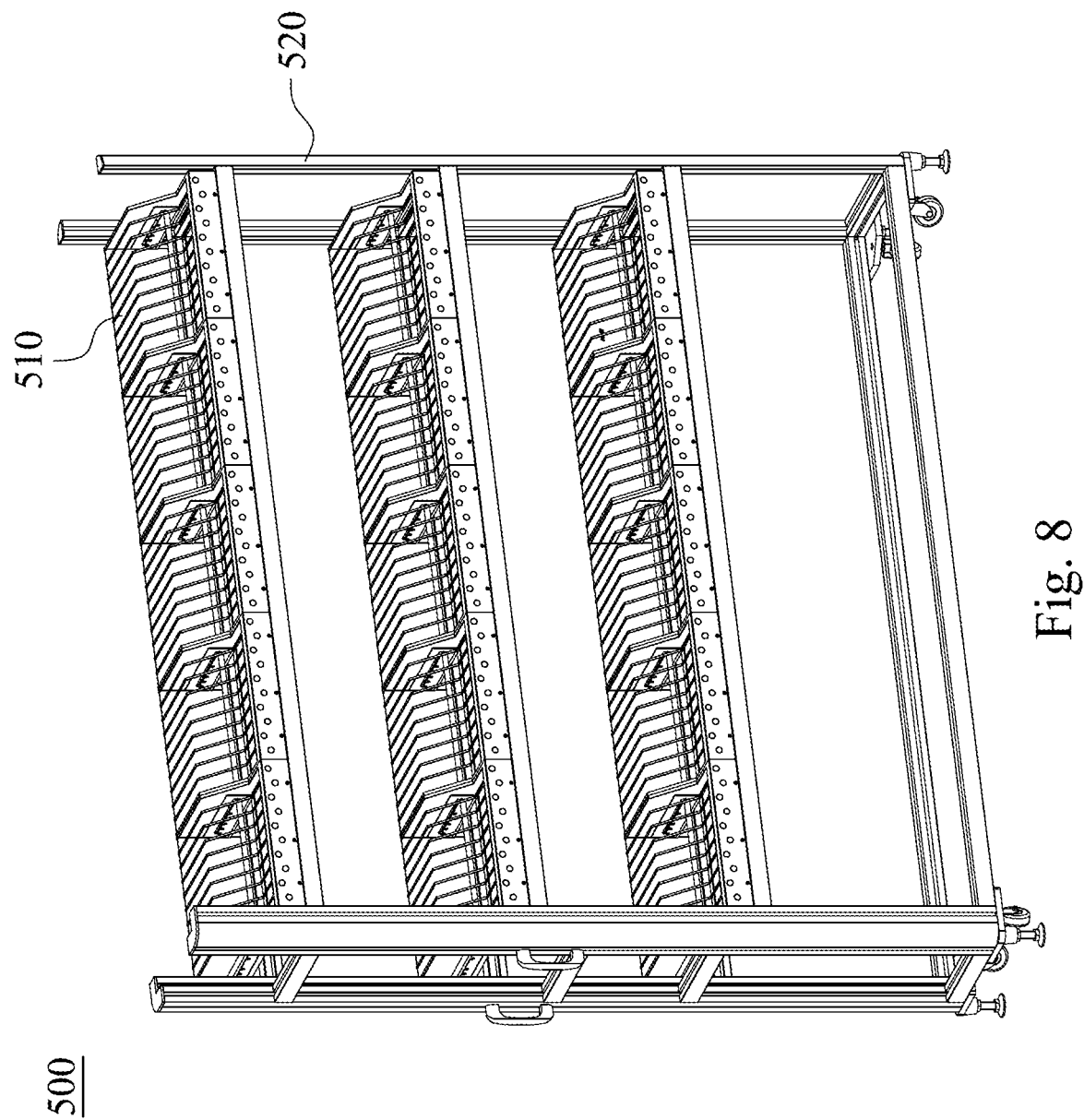
FIG. 8 is a three-dimensional structure schematic view of a sensing rack set according to one example of another embodiment of the present disclosure.

Please refer to FIG. 8. FIG. 8 is a three-dimensional structure schematic view of a sensing rack set 500 according to one example of another embodiment of the present disclosure. In FIG. 8, the sensing rack set 500 includes at least two sensing racks 510 and a connecting supporting element 520. The connecting supporting element 520 is connected to and for supporting the sensing racks 510. In detail, according to the example in FIG. 8, the technical details of the sensing racks 510 are the same as the technical details of the sensing rack 100 according to the example in FIG. 1, and will not be described again.

In particular, although the connecting supporting element 520 has three layers and five sensing racks 510 are disposed in each layer of the connecting supporting element 520 in the example in FIG. 8, but the present disclosure is not limited thereto. The amount of the layers of the connecting supporting element and the amount of sensing racks disposed in each layer can be adjusted on demand.

Figure 9:
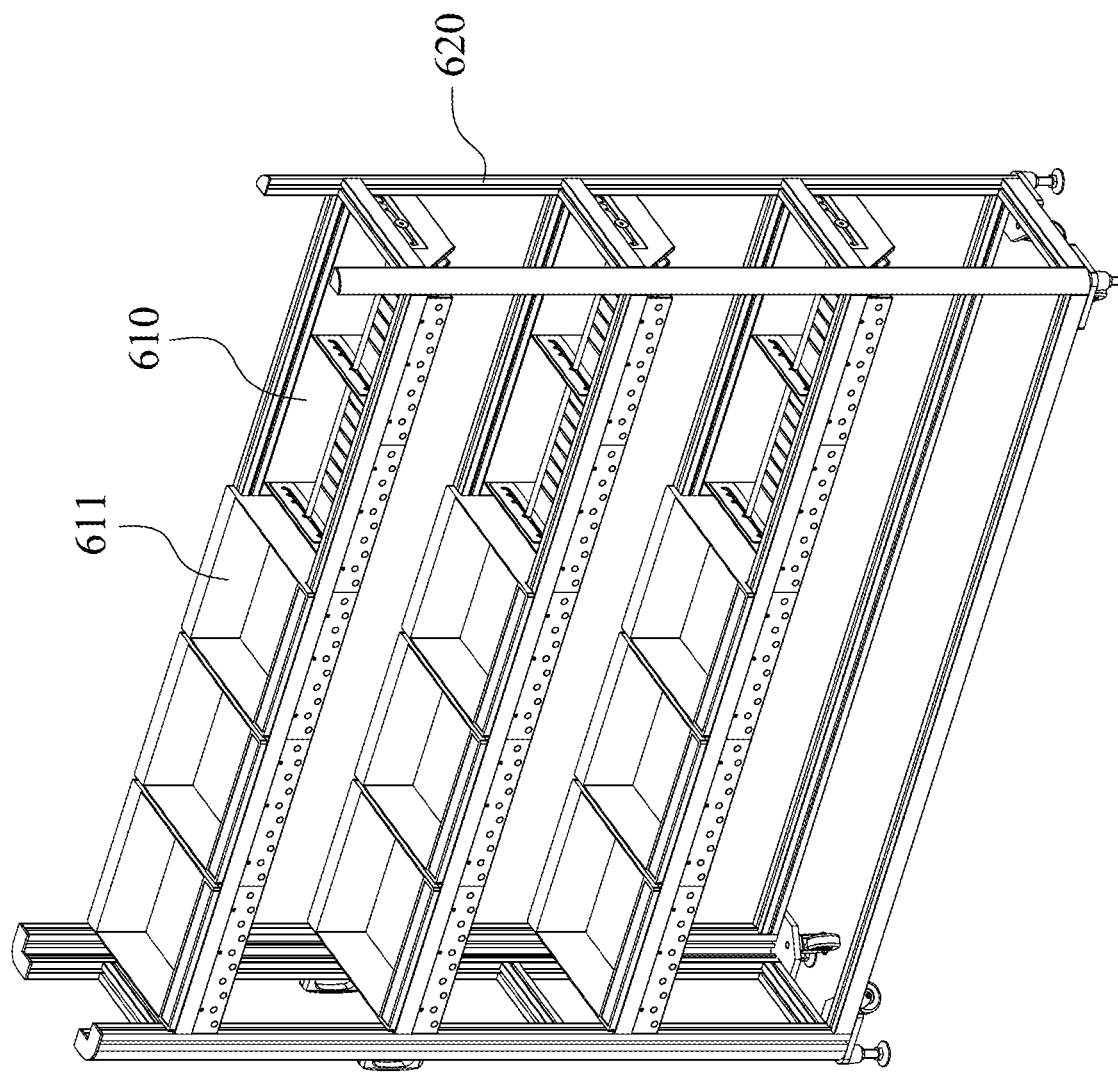
FIG. 9 is a three-dimensional structure schematic view of a sensing rack set according to another example of the embodiment of the present disclosure.

Please refer to FIG. 9. FIG. 9 is a three-dimensional structure schematic view of a sensing rack set 600 according to another example of the embodiment of the present disclosure. According to FIG. 9, the sensing rack set 600 includes at least two sensing racks 610 and a connecting supporting element 620. In comparison with the sensing racks 510 of sensing rack set 500 in FIG. 8, the sensing racks 610 in the example of sensing rack set 600 in FIG. 9 are invertly disposed on the connecting supporting element 620, and some of the sensing racks 610 include a fitting element 611. The technical details of the sensing racks 610 and the fitting elements 611 are the same as the technical details of the sensing rack 300 and the fitting element 370 in FIG. 5, and will not be described again herein.

In particular, according to FIG. 9, there are nine sensing racks 610 with the fitting element 611. Further, the connecting supporting element 620 has three layers and five sensing racks 610 are disposed in each layer of the connecting supporting element 620 in the example of FIG. 9, but the present disclosure is not limited thereto. The amount of sensing racks with fitting element, the amount of the layers of the connecting supporting element and the amount of sensing racks disposed in each layer can be adjusted on demand.

Therefore, the sensing rack of the present disclosure can be connected in series or in parallel so as to obtain the sensing rack set of the present disclosure for obtaining more accommodating spaces when an operator has a demand of storing great amount of objects or raw materials.

In summary, the light blocking elements of the sensing rack and the sensing rack set of the present disclosure are driven by the weight of the disposed object so as to block or not block the light emitted by the light emitting element, and the determination of whether the object is correctly disposed in accommodating spaces can be made. Therefore, it is able to avoid the disoperation occurring when a transparent or light transmittable object is disposed in the sensing rack or the sensing rack set, which is usually happened in the conventional sensing rack and the conventional sensing rack set. Therefore, the cast of labor or time can be decreased, the economic loss in industry or business can be also avoided. Moreover, the sensing rack and the sensing rack set of the present disclosure can also be applied with the fitting element, which is favorable for containing various objects or raw materials and can be widely applied in various fields.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sensing rack, comprising:
   a base comprising a plurality of accommodating spaces;
   a plurality of sensing mechanisms disposed in the base corresponding to at least one sidewall of the base, and each of the sensing mechanisms corresponding to each of the accommodating spaces, wherein each of the sensing mechanisms comprises:
      a light sensing component comprising a light emitting element and a light receiving element, wherein the light emitting element and the light receiving element are disposed relatively; and
      a light blocking element disposed in each of the accommodating spaces, wherein the light blocking element is drivable to move between the light emitting element and the light receiving element so as to control a light of the light emitting element to enter the light receiving element or not; and
   a plurality of displaying elements, wherein each of the displaying elements is electrically connected with the light receiving element of each of the sensing mechanisms, and each of the displaying elements is for displaying the light of each of the light emitting elements entering the light receiving element or not.

2. The sensing rack of claim 1, further comprising:
   at least one positioning element disposed at the at least one sidewall and the sensing mechanisms disposed thereon, wherein the at least one positioning element has a plurality of through holes corresponding to the accommodating spaces, and the light emitting element and the light receiving element of each of the sensing mechanisms are disposed at two sides of each of the through holes, respectively.

3. The sensing rack of claim 2, wherein the light blocking element of each of the sensing mechanisms is pivotally disposed at the at least one positioning element, and an end of each of the light blocking elements is disposed through each of the through holes.

4. The sensing rack of claim 3, wherein a center of mass of the light blocking element of each of the sensing mechanisms is closer to the end of the light blocking element.

5. The sensing rack of claim 1, further comprising:
a plurality of supporting ribs connected with the at least one sidewall of the base, wherein every two of the supporting ribs adjacent to each other form each of the accommodating spaces.

6. The sensing rack of claim 5, further comprising:
a separating rib disposed to and connected with other two sidewalls, wherein the supporting ribs are connected between the at least one sidewall and the separating rib.

7. The sensing rack of claim 1, further comprising:
at least one slide rail set comprising two slide rails, wherein the two slide rails are correspondingly disposed at other two sidewalls of the base, respectively; and
at least one moveable axle, wherein two ends of the moveable axle are moveably disposed at the two slide rails, respectively, and the moveable axle is passed through the accommodating spaces.

8. The sensing rack of claim 1, further comprising:
a fitting element connected with the at least one sidewall, wherein the fitting element provides an engaging function or a storing space.

9. The sensing rack of claim 1, wherein the light is an infrared light.

10. The sensing rack of claim 1, wherein the displaying elements are a plurality of three primary color light-emitting diode modules.

11. A sensing rack set, comprising:
at least two sensing racks, wherein each of the sensing racks comprises:
a base comprising a plurality of accommodating spaces;
a plurality of sensing mechanisms disposed in the base corresponding to at least one sidewall of the base, and each of the sensing mechanisms corresponding to each of the accommodating spaces, wherein each of the sensing mechanisms comprises:
a light sensing component comprising a light emitting element and a light receiving element, wherein the light emitting element and the light receiving element are disposed relatively; and
a light blocking element disposed in each of the accommodating spaces, wherein the light blocking element is drivable to move between the light emitting element and the light receiving element so as to control a light of the light emitting element to enter the light receiving element or not; and
a plurality of displaying elements, wherein each of the displaying elements is electrically connected with the light receiving element of each of the sensing mechanisms, and each of the displaying elements is for displaying the light of each of the light emitting elements entering the light receiving element or not; and
a connecting supporting element connecting and supporting the at least two sensing racks.

12. The sensing rack set of claim 11, wherein each of the sensing racks further comprises:
at least one positioning element disposed at the at least one sidewall and the sensing mechanisms disposed thereon, wherein the at least one positioning element has a plurality of through holes corresponding to the accommodating spaces, and the light emitting element and the light receiving element of each of the sensing mechanisms are disposed at two sides of each of the through holes, respectively.

13. The sensing rack set of claim 12, wherein the light blocking element of each of the sensing mechanisms is pivotally disposed at the at least one positioning element, and an end of each of the light blocking elements is disposed through each of the through holes.

14. The sensing rack set of claim 13, wherein a center of mass of the light blocking element of each of the sensing mechanisms is closer to the end of the light blocking element.

15. The sensing rack set of claim 11, wherein each of the sensing racks further comprises:
a plurality of supporting ribs connected with the at least one sidewall of the base, wherein every two of the supporting ribs adjacent to each other form each of the accommodating spaces.

16. The sensing rack set of claim 15, wherein each of the sensing racks further comprises:
a separating rib disposed to and connected with other two sidewalls, wherein the supporting ribs are connected between the at least one sidewall and the separating rib.

17. The sensing rack set of claim 11, wherein each of the sensing racks further comprises:
at least one slide rail set comprising two slide rails, wherein the two slide rails are correspondingly disposed at other two sidewalls of the base, respectively; and
at least one moveable axle, wherein two ends of the moveable axle are moveably disposed at the two slide rails, respectively, and the moveable axle is passed through the accommodating spaces.

18. The sensing rack set of claim 11, wherein at least one of the sensing racks further comprising:
a fitting element connected with the at least one sidewall, wherein the fitting element provides an engaging function or a storing space.

19. The sensing rack set of claim 11, wherein the light is an infrared light.

20. The sensing rack set of claim 11, wherein the displaying elements are a plurality of three primary color light-emitting diode modules.

* * * * *